2,046,522

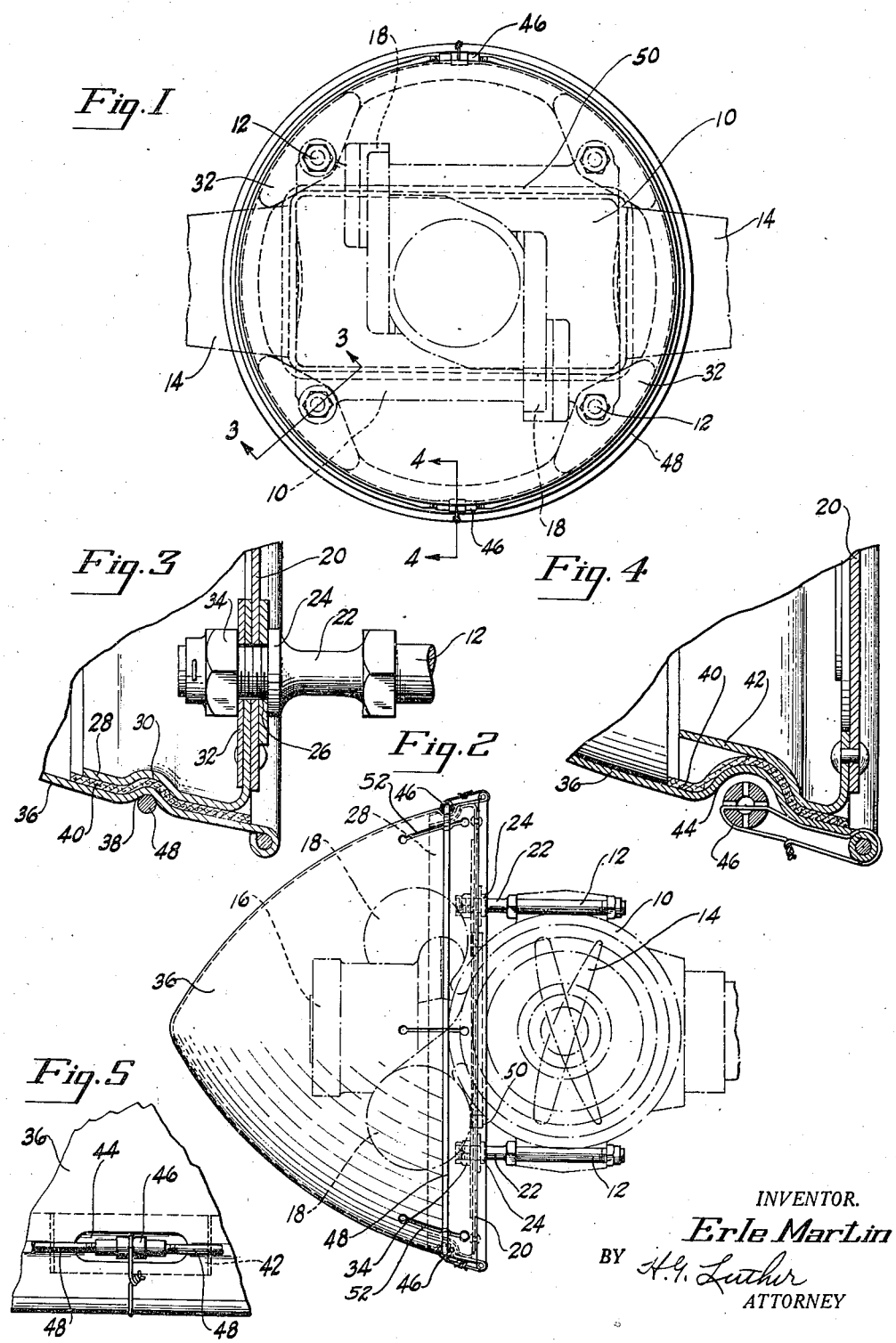
July 7, 1936.　　　　E. MARTIN　　　　2,046,522
SPINNER
Filed Aug. 21, 1934
INVENTOR.
Erle Martin
BY H. G. Luther
ATTORNEY Patented July 7, 1936

UNITED STATES PATENT OFFICE 2,046,522

SPINNER

Erle Martin, Hartford, Conn., assignor, by mesne assignments, to United Aircraft Corporation, a corporation of Delaware Application August 21, 1934, Serial No. 740,775

15 Claims. (Cl. 170—177)

This invention relates to a spinner and more particularly to a spinner for use with a controllable pitch aircraft propeller.

One of the objects of this invention is to provide a spinner which may be readily attached to and detached from its support.

Another object is to provide a simple support for a spinner.

Another object is to provide an enclosure for the pitch changing mechanism.

Other objects and advantages of my invention will be apparent from the attached specification and the accompanying drawing which disclose what is now considered the preferred embodiment.

Fig. 1 is a front elevation of the spinner.

Fig. 2 is a side elevation thereof.

Figs. 3 and 4 are detail views showing the spinner supporting means.

Fig. 5 is a detail view showing the pocket to receive the turnbuckle.

This invention is shown applied to a controllable pitch propeller having a split hub 10 held together by bolts 12, and propeller blades 14 shown as broken off in Fig. 1. The propeller also comprises an actuating cylinder 16 and counterweights 18.

The bolts 12 are formed with an integral extension 22 having a flanged portion 24 and a threaded portion 26 adapted to support a back plate 20. The back plate has formed thereon or, as shown, riveted thereon, an annular flange 28 having a groove 30 therein. The portions of the back plate 20 adjacent the holes to receive the bolts 26 are reenforced by the plates 32. A nut 34 screwed onto the threaded portion 26 of the bolt 12 serves to hold the back plate securely in place. The bolts 12 act as means to center and guide the back plate 20 and the flange 28 and if the various parts are accurately made the flange 28 will run substantially true.

The spinner proper indicated by the numeral 36 is made preferably of a single piece of metal formed to the desired shape but it may be built up of several members or the nose portion may be made detachable for purposes of inspection. An annular bead 38 is formed in the spinner shell to correspond with the annular groove 30 in the flange 28. A packing 40, preferably rubber, is provided between the spinner and the flange 28 to prevent chafing that might otherwise occur.

A pocket 42 is formed in the annular groove 30 of the flange 28 and the outer surface of the spinner is correspondingly indented as at 44 so that the indentation 44 forms a projection on the inside surface of the spinner which fits into the pocket 42 and acts as a form of key to prevent rotation of the spinner on the supporting flange. In addition the indentation 44 allows clearance for the turn buckles 46 used to tighten the rods 48.

The rods 48 which in the embodiment shown consist of two semi-circular members threaded at each end to receive the turn buckles are placed in the annular bead 38 in the spinner 36 and serve to contract the spinner and especially the bead 38 onto the flange 28 to hold the spinner in position. If desired the spinner shell may be slotted at one or more places around the circumference adjacent the bead 38, as shown at 52 in Fig. 2 to provide separate integral strips or tongues between the slots, to give that portion of the spinner greater flexibility so that the bead 38 may be more easily drawn down into the groove 30 of the flange 28. If the material of the spinner is sufficiently flexible of itself it, of course, will be unnecessary to provide the slots.

It has been found convenient in some installations to maintain the area under the spinner dust proof to thereby keep all dust away from the propeller pitch changing mechanism and to this end a rubber gasket, indicated as 50, has been fitted between the back plate 20 and the propeller hub 10 so as to make a dust tight joint. If the slots 52 are used in the dust tight installation they are made of such a length that they are entirely covered by the rubber packing 40 so that there is no direct opening into the interior of the spinner.

In order to assemble this spinner after the flange member 28 has been installed, it is only necessary to place the rubber gasket 40 in position and then push the spinner onto the rubber packing until the annular bead 38 snaps into the groove 30. The rods 48 are then placed in position in the bead 38 and the turn buckles tightened which will automatically fasten the spinner in position and center it.

Although I have described and shown what is now considered the preferred embodiment of my invention, it should be understood that the invention may be otherwise embodied and that the drawing is not to be construed as defining or limiting the scope of the invention, but as illustrative only.

It is, therefore, to be understood that the invention is not limited to the specific embodiments herein illustrated and described, but may be used in other ways without departure from its spirit, as defined by the following claims.

What I claim is:

1. In combination, a split propeller hub, means for holding said hub parts in assembled relation, a plate mounted on said holding means and a spinner detachably mounted on and carried by said plate.

2. In combination, a split propeller hub, means for holding said hub parts in assembled relation, a plate having an annular flange with an annular groove therein mounted on said holding means and a spinner detachably associated with said flange and having an annular bead co-acting with the groove in said flange and means for contracting said bead into said groove.

3. In combination, a split propeller hub, means for holding said hub parts in assembled relation, a plate having an annular flange with an annular groove therein mounted on said holding means and a spinner associated with said flange and having an annular bead co-acting with the groove in said flange and means for forcing said bead into said groove for detachably securing said spinner on said plate.

4. In a controllable pitch propeller having a hub and pitch changing mechanism located at the forward portion thereof, a dust tight cover for said mechanism comprising a plate supported from said hub, a dust tight joint between said plate and said hub, a spinner supported on said plate and a dust tight joint between said spinner and said plate.

5. In a controllable pitch propeller having a hub and pitch changing mechanism associated therewith, a dust tight cover for said mechanism comprising, in combination, a plate supported from said hub, portions of said hub projecting through said plate, a packing strip forming a dust tight joint between said hub and said plate, a spinner supported on said plate and a packing strip forming a dust tight joint between said spinner and said plate.

6. In combination, a ring-shaped member, a spinner arranged in telescopic relation therewith, means for contracting said spinner onto said ring-shaped member and a packing of resilient material between said spinner and said ring-shaped member.

7. In combination, a ring-shaped member, a spinner associated therewith, means for contracting said spinner onto said ring-shaped member and means between said spinner and said member to prevent chafing.

8. In combination, a ring-shaped member, a spinner arranged in telescopic relation therewith, means for contracting said spinner onto said ring-shaped member and a packing strip between said spinner and said member.

9. In combination, a split propeller hub, bolts for holding said split hub in assembled relation, and a spinner support mounted on extensions of said bolts.

10. In combination, a ring-shaped member having a groove extending around the circumference thereof and depressed portions in said groove, a spinner associated with said ring-shaped member having a bead adapted to co-act with said recess, said bead having raised portions adapted to seat in said depressed portions of said groove whereby relative rotation of said spinner and ring-shaped member is prevented.

11. A spinner comprising, in combination, a nose portion, a continuous trailing edge portion, a plurality of separate strips connecting said portions and integral therewith.

12. A spinner comprising, in combination, a nose portion, a continuous trailing edge portion, a plurality of separate strips connecting said portions and integral therewith, a support for said spinner and means for contracting said strips onto said support to secure said spinner thereon.

13. A spinner comprising, in combination, a nose portion, a continuous trailing edge portion, a plurality of separate strips connecting said portions and integral therewith, a support for said spinner, a band encircling said spinner adjacent said strips and means for contracting said band to secure said spinner to said support.

14. A spinner comprising, in combination, a one piece front portion, a one piece rear portion and a plurality of separate strips integral with and connecting said portions.

15. A spinner comprising, in combination, a front portion having an endless ring cross-section, a rear portion having an endless ring cross-section and a plurality of strips integral with and connecting said portions.

ERLE MARTIN.